United States Patent [19]

Constantino

[11] Patent Number: 4,961,896
[45] Date of Patent: Oct. 9, 1990

[54] METHOD OF MAKING SIMULATED FABRIC

[75] Inventor: James P. Constantino, Mt. Clemens, Mich.

[73] Assignee: Cadillac Products, Inc., Troy, Mich.

[21] Appl. No.: 267,451

[22] Filed: Nov. 4, 1988

[51] Int. Cl.$^5$ .............................................. B29C 59/02
[52] U.S. Cl. ................................... 264/293; 264/324
[58] Field of Search ...................... 264/284, 293, 324; 156/209; 427/200

[56] References Cited

U.S. PATENT DOCUMENTS

| | | |
|---|---|---|
| 2,345,939 | 4/1944 | Leary . |
| 2,700,205 | 1/1955 | Rice .................................... 156/209 |
| 3,484,835 | 12/1969 | Trounstine et al. ................. 264/284 |
| 3,591,401 | 7/1971 | Snyder et al. ........................ 264/132 |
| 3,917,883 | 11/1975 | Jepson .................................. 427/198 |
| 3,961,115 | 6/1976 | Klein ..................................... 428/88 |
| 3,979,487 | 9/1976 | Squier et al. ............................ 264/24 |
| 4,018,066 | 4/1977 | Fennekels et al. ................... 156/209 |
| 4,180,606 | 12/1979 | Hance et al. ............................ 428/88 |
| 4,362,773 | 12/1982 | Shikinami ............................. 156/209 |
| 4,376,147 | 3/1983 | Byrne et al. ........................ 428/167 |
| 4,546,029 | 10/1985 | Cancio et al. ........................ 428/141 |
| 4,588,629 | 5/1986 | Taylor ..................................... 428/88 |
| 4,623,572 | 11/1986 | Irrlitz et al. ............................ 428/90 |
| 4,668,323 | 5/1987 | Lenards et al. ...................... 427/200 |
| 4,808,458 | 2/1989 | Watt et al. ............................ 427/200 |

Primary Examiner—James Lowe
Attorney, Agent, or Firm—Harness, Dickey & Pierce

[57] ABSTRACT

A simulated fabric is produced by heating a substrate having a layer of flocked material so that both the substrate and the flocked material are softened, and applying the surface of a mold, having a finely detailed simulated fabric pattern on it, to the flocked material to plastically deform the flock to a thickness less than the original thickness such that it acquires substantially the same pattern as on the mold surface.

12 Claims, 1 Drawing Sheet

METHOD OF MAKING SIMULATED FABRIC

FIELD OF THE INVENTION

This invention relates to simulated fabrics, and more particularly, to a simulated fabric exhibiting improved visual and tactile characteristics.

BACKGROUND OF THE INVENTION

Synthetic simulated fabric materials have become increasingly popular in recent years for employment in applications requiring features such as increased wear and abrasion resistance, durability, moisture resistance, and relatively low cost.

Simulated fabric materials prepared by embossing plastic substrate materials with a fine pattern have been produced. Such materials can be produced to visually resemble a wide variety of fabrics and designs.

Suitable combinations of temperature and pressure conditions, applied to a layer of flocked material which is adhered to a plastic substrate, including foamed substrates, have been proposed to render different appearance characteristics. For instance, it is possible to vary temperature and pressure conditions to provide a simulated fabric having improved color contrast between the substrate and the flocked material.

Mechanical processing steps, such as beating a wetted layer of flocked material on a substrate have been suggested to produce a simulated fabric. It is also possible to apply a layer of flocking material to a substrate, such as a foamed substrate, having a pattern already formed thereon, i.e., a pattern formed beneath the flock layer. Likewise, it is possible to apply flocked material to a substrate to form a predetermined pattern by aligning the fibers in a predetermined orientation while adhering them to a substrate.

It is thus an object of the present invention to provide a relatively inexpensive material that exhibits improved visual and tactile resemblance to a fabric, and that can be easily formed to produce contoured three-dimensional articles having a simulated fabric surface.

DESCRIPTION OF THE PREFERRED EMBODIMENT

While this invention is described in connection with a simulated fabric, it will be appreciated that the methods and articles of manufacture of the present invention encompass the simulation of other patterns or designs.

Figure 1:
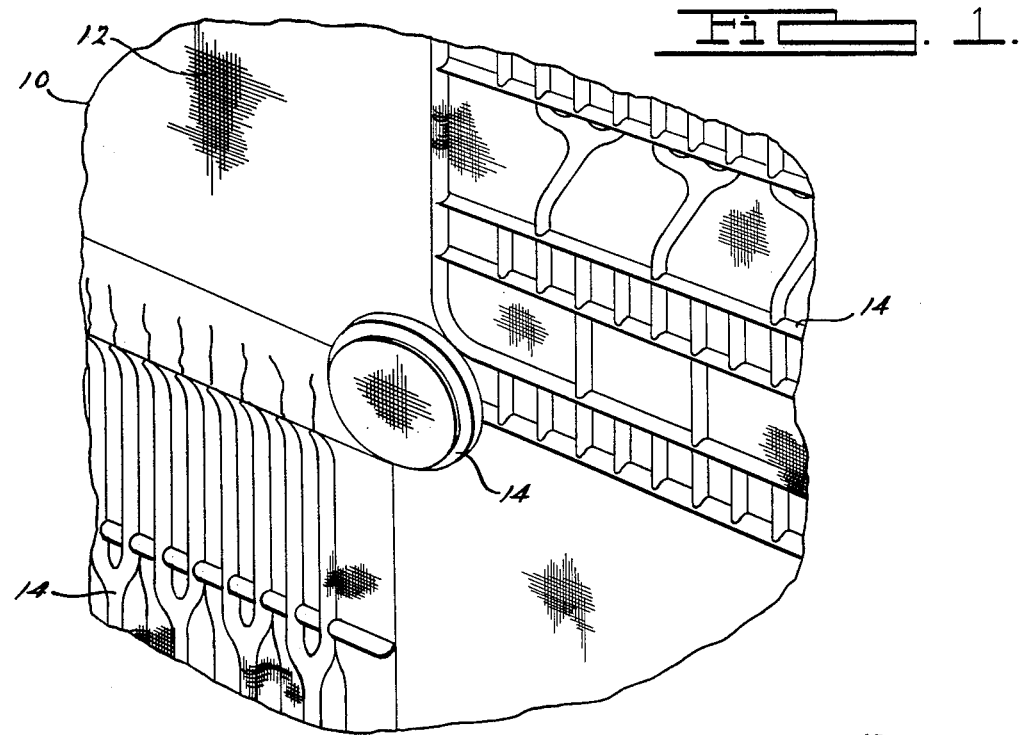
FIG. 1 is a fragmentary perspective view of an embossed simulated fabric of the present invention.
Figure 2:
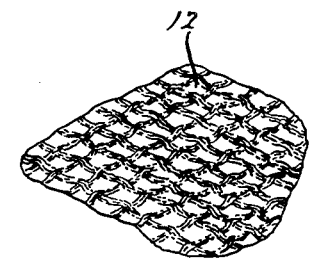
FIG. 2 is an enlarged perspective view of the surface of a simulated fabric of the present invention.

In accordance with the present invention there is shown in FIGS. 1 and 2 a simulated fabric 10. The simulated fabric 10, which both visually and tactually resembles a predetermined type of fabric, can be a substantially planar material. Such planar material may be embossed in predetermined areas with a design having a relatively fine pattern 12, i.e., a typical boss height on the order of about 0.1 mm. Preferably, the relatively fine pattern 12 simulates a fabric. Further, the planar material may be embossed in predetermined areas with a relatively pronounced embossing pattern 14, wherein the boss height is one or more orders of magnitude greater than the boss height of the relatively fine pattern 12 boss height.

Alternatively, the simulated fabric may be formed to produce a fully contoured three-dimensional article. The contoured three-dimensional article, likewise, may have a relatively fine embossing pattern 12, a relatively pronounced embossing pattern 14 or a combination thereof applied to a contoured three-dimensional substrate in predetermined areas of the substrate. For example, without limitation, a contoured three-dimensional article such as a lamp shade or a container liner, such as a casket liner, having an embossed pattern thereon to simulate a fabric, may be produced in accordance with the present invention.

Figure 3:
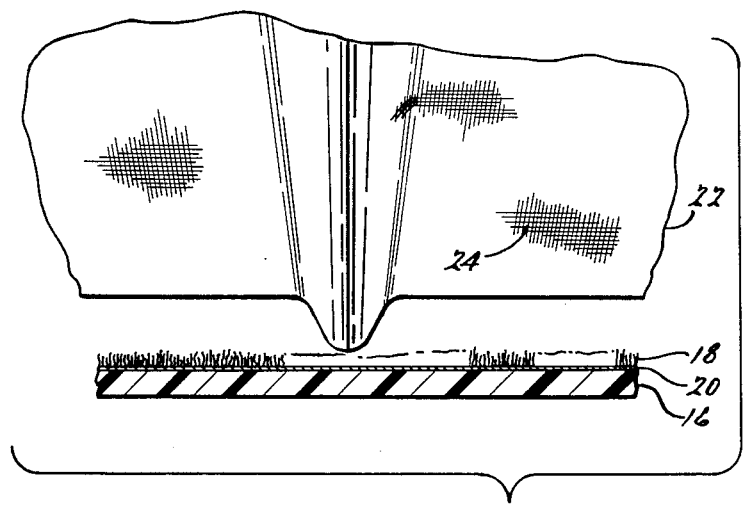
FIG. 3 is a greatly enlarged diagramatic cross-sectional view of the raw material for forming the simulated fabric of the present invention, and a molding apparatus for forming the same.

The techniques of the present invention have been found to yield a surprisingly realistic simulated fabric. Referring to FIG. 3, the components of simulated fabric 10 comprise a substrate layer 16, and a layer of flocked material 18, i.e., "flock layer". In the preferred embodiment of the present invention, an adhesive layer 20 is used to bond the flock layer to the substrate, using conventional techniques.

The flock layer 18, having a predetermined thickness, preferably has a predetermined pattern of a predetermined depth formed therein. Preferably, the depth of the pattern in the flock layer is less than the thickness of the flock layer.

As seen in FIG. 2, the pattern formed in the flock layer preferably resembles visually and tactually a predetermined fabric or design. For instance, it is contemplated that the pattern formed in the flock layer 18 generally simulates a texture of one or more fabrics of the type, without limitation, such as knit, woven, unweft, or mat. More particularly, the pattern formed in the flock layer 18 preferably simulates one or more fabrics, without limitation, such as felt, flannel, corduroy, terry cloth, silk, suede, taffeta, twill, tweed, worsted, velvet, velour, crepe, gauze, linen, webbing or combinations thereof. Further, it is possible that flock layer 18 and/or substrate 16 have formed therein one or more simulated effects such as effects that resemble stitches, quilts, pleats, seams, perforations, buttons, embroidery, plaids, geometric shapes, shadows, or other desired designs or patterns.

The flock layer 18 of the simulated fabric 10 of the present invention, is notable for the fine patterns formed therein. For instance, it is contemplated that a pattern simulating a fabric, or other design, having the feel and appearance of a fabric having at least about 10 threads/mm, can be formed in the flock layer 18.

The flocked material employed in the flock layer 18 is preferably a fibrous material which, upon application of suitable combinations of heat and pressure, is capable of being plastically deformed to form, and thereafter being able to retain, a predetermined pattern. Preferably, the predetermined pattern resembles one or more of the above fabric patterns. Preferably, the flocked material is a thermoplastic material. More preferably, the flocked material is a random or precision type material selected from the group consisting of acrylics, nylons, or mixtures thereof. In a highly preferred embodiment the flocked material is an acrylic. Fibers of the flocked material may be any desired length, denier, color or texture, or may be a combination of different lengths, deniers, colors or textures. The selection of a suitable fiber is limited only by the texture or pattern of the surface to be simulated.

Preferably, the material used for the substrate 16 is a material which is capable of being plastically deformed to retain a predetermined shape. For instance, substrate materials can be selected from any suitable thermoplastic polymer that will soften with the application of heat. In the present embodiment, the preferred substrate material is polystyrene. It is preferred that the substrate remains, even after embossing of a generally uniform thickness, i.e. the opposite surfaces thereof remain generally parallel to each other.

The simulated fabric 10 of the present invention, due to its close resemblance to actual fabric, may suitably be employed in many applications, particularly those where a flexible, semirigid or rigid, contoured three-dimensional or substantially planar, part or panel, having a fabric appearance and texture is desired. For instance, the simulated fabric of the present invention may be employed in applications including, without limitation, automotive interiors, aircraft interiors, architectural panels, wall coverings, floor coverings, container liners, furniture, clothing, patching material, appliques, labels and the like.

The simulated fabric described above and shown in the drawings may be prepared according to the steps outlined herein.

Preferably, the thermoplastic substrate 16 is formed into a self-supporting continuous film or sheet by suitable methods such as casting, extruding, rolling or the like. A flock layer 18 is applied to the substrate 16 using any method suitable for fixably securing the flocked material to the substrate. One skilled in the art will appreciate that there are a number of known methods for applying flocked material to a substrate. For instance, fibers of flocked material may be applied to an adhesive layer which is, in turn, applied to the substrate using conventional methods. Or, a suitable adhesive may be applied to the substrate and the flocked material spread thereover using suitable methods. The flocked material may also be releasably adhered to a backing layer, and then applied to the substrate. Alternatively, the flocked material may be applied using electrostatic flocking techniques, which are known in the art.

A mold 22 having a fine patterned surface 24 thereon is prepared for imparting a predetermined fine pattern to the flock layer 18 when brought into contact therewith under suitable combinations of pressure and temperature. The mold 22 may, in addition to a relatively fine embossing pattern, have a relatively pronounced embossing pattern, or a mixture thereof such as shown in FIG. 1. To produce a simulated fabric, the fine pattern formed on the mold surface 24 simulates a fabric. In addition to the fine pattern, the mold 22 may also have a configuration suitable for forming contoured three-dimensional articles.

Preferably the mold 22 is made by casting aluminum into a predetermined configuration. The cast aluminum mold is then engraved, using suitable methods, to form the predetermined mold surface fine pattern. The mold, however, may also be made by conventional methods such as electroformed tooling methods, vapor formed tooling methods, or spray metal tooling methods.

The mold 22 is engraved using methods known in the art, such as photoetching or other suitable engraving techniques, to selectively form the predetermined pattern on the surface thereof. One skilled in the art will appreciate that any other suitable engraving methods may be employed to obtain a fine design on the mold surface 24.

The substrate 16, having the flock layer 18 applied thereto, is introduced to the surface of the mold so that the flock layer contacts the patterned mold surface 24. Preferably, the present forming step employs known vacuum or pressure molding techniques. However, to form the pattern in the flock layer it is also possible to employ methods such as mechanical forming methods, air blowing methods, or the like. Thus, the present forming step involves the application to the substrate 16 and the flock layer 18 of one or more predetermined amounts of pressure, and heating said substrate 16 and said flock layer 18 at one or more predetermined temperatures, for one or more predetermined amounts of time to cause at least a portion of the flock layer to plastically deform and thereby acquire substantially the same pattern as the fine pattern on the mold surface 24 to form the simulated fabric 10. By virtue of the time, temperature and pressure conditions employed in the present method it is further possible to cause plastic deformation of the substrate to form a relatively pronounced embossing pattern thereon and thereby form a substantially planar article having an embossed pattern thereon, or a contoured three-dimensional article having an embossed pattern thereon.

The heating temperature selected for the present forming step preferably takes into account factors such as the softening point of the substrate material, the pressure to be applied to the substrate and the flocked layer, the amount of time the selected temperature and pressure conditions are to be maintained, the type and thickness of the substrate and flock layer, the complexity of the desired pattern, and the like. Further, the temperature should preferably be selected to render the flocked material pliable, i.e., plastically deformable, but not high enough to cause the flocked material to burn. For instance, in the present preferred embodiment, in which the substrate material is styrene, and the flocked material is an acrylic, the forming temperature is about 275° F. to about 325° F. Further, to consistently produce relatively high-quality parts it is preferable that the temperature of the substrate be substantially uniform throughout the substrate.

The step of heating the substrate and flock layer to the predetermined temperature may be done in any suitable manner including, without limitation, heating in a forced air oven, infrared radiation heating, or the like. Further, the substrate and flock layer may be heated while in the mold. Alternatively, the substrate and flock layer may be preheated to a predetermined temperature in a preheating station and then transferred to the mold. Preferably, heat is applied in a sandwich type fashion, where heat is substantially contemporaneously directed to the flock layer, as well as the substrate. It is possible, however, to heat only one layer at a time.

Pressure is preferably applied from an external pressure source in an amount sufficient to cause the flocked material to deform plastically and retain substantially the same pattern defined by the pattern formed on the mold surface 24. Preferably, upon application of pressure, the flocked material is already pliable, due to the application of heat thereto. During application of pressure, the compression of the pliable fibers of the flock layer 18 thereby causes at least a portion of the flock layer 18 to acquire substantially the same pattern as that found on the surface 24 of the mold.

The amount of pressure applied to the substrate and flock layer varies and depends upon a number of factors including, without limitation, the temperature employed for forming the flock layer and the substrate, the amount of time the selected temperature and pressure conditions are to be maintained, the type and thickness of the substrate and flock layer, the complexity of the desired pattern, and the like. In the present embodiment, the pressure applied is preferably in the range of about 50 to about 80 psi. While batch production or semi-automatic production of materials is possible according to the methods of the present invention, preferably the steps of heating and pressing are done continuously. Thus, it is contemplated that any suitable thermoforming machinery may be employed in the present forming steps including in-line, single station, or rotary type machinery.

The pressure is applied for one or more predetermined amounts of time. The amount of time preferably should be selected as an amount long enough to permit the fibers of the flock layer to become pliable and deform under pressure. This can range from as little as a few seconds to several minutes or longer, and depends upon factors including without limitation, the temperature and pressure employed for forming, the type and thickness of the flock layer and substrate, the complexity of the desired pattern, and the like. In the present preferred embodiment temperature and pressure conditions are maintained for about 30 seconds to about 1 minute. The materials are then cooled to cause the fibers to retain their deformed shape and thereby render the previously described simulated fabric 10.

While it will be apparent that the preferred embodiments of the invention disclosed are well calculated to provide the advantages and features above stated, it will be appreciated that the invention is susceptible to modification, variation and change without departing from the proper scope or fair meaning of the subjoined claims.

What is claimed is:

1. A method for manufacturing a simulated fabric, said method comprising the steps of:
   (a) providing a substrate having a layer of flocked material applied thereto, said layer of flocked material having a predetermined thickness;
   (b) contacting said flocked material with a surface of a mold, said mold surface including a predetermined finely detailed simulated fabric pattern formed thereon;
   (c) heating said substrate and said layer of flocked material to one or more predetermined temperatures to soften said substrate and said layer of flocked material; and
   (d) applying one or more predetermined amounts of pressure to said substrate and said layer of flocked material for one or more predetermined amounts of time, to cause a portion of said layer of flocked material to plastically deform to a predetermined thickness less than said thickness of said layer of flocked material and thereby acquire substantially the same pattern as said pattern on said mold surface.

2. The method of claim 1 wherein said contacting step (b) comprises contacting said flocked material with a surface of a mold, said mold surface having a predetermined fine pattern simulating a fabric and a relatively pronounced embossing pattern formed thereon.

3. The method of claim 2 wherein said contacting step (b) comprises contacting said layer of flocked material with a surface of a mold suitable for forming a contoured three-dimensional article.

4. The method of claim 3 wherein said mold is adapted for forming a casket liner.

5. The method of claim 1 wherein said contacting step (b) comprises contacting said flocked material with a surface of a mold, said mold surface having a predetermined fine pattern simulating a fabric, and further wherein said mold is suitable for forming a contoured three-dimensional article.

6. The method of claim 5 wherein said mold is adapted for forming a casket liner.

7. The method of claim 1 wherein said providing step (a) comprises providing a thermoplastic substrate having a layer of a thermoplastic flocked material applied thereto.

8. The method of claim 1 wherein said providing step (a) comprises providing a polystyrene substrate having a layer of flocking material applied thereto, said flocking material being selected from the group, consisting of acrylics, nylons, or mixtures thereof.

9. The method of claim 8 wherein said temperature of heating step (c) is about 275° F. to about 375° F., said pressure of said applying step (d) is about 50 to about 80 psi, and said time of said applying step (d) is about 30 seconds to about 1 minute.

10. The method of claim 1 wherein said predetermined finely detailed fabric pattern formed on said mold surface simulates a fabric having at least about 10 threads/mm.

11. The method of claim 1 wherein said predetermined finely detailed fabric pattern formed on said mold surface has a typical boss height on the order of about 0.1 mm.

12. The method of claim 1 wherein said substrate of said providing step (a) is a self-supporting substrate.

* * * * *